United States Patent [19]

Yamato

[11] Patent Number: 4,860,482
[45] Date of Patent: Aug. 29, 1989

[54] FISHING ROD

[75] Inventor: Yoshiro Yamato, Sakai, Japan

[73] Assignee: Shimano Industrial Company Limited, Osaka, Japan

[21] Appl. No.: 268,049

[22] Filed: Nov. 7, 1988

[30] Foreign Application Priority Data

Nov. 12, 1987 [JP] Japan .......................... 62-173421[U]

[51] Int. Cl.⁴ ............................................ A01K 87/04
[52] U.S. Cl. ........................................ 43/18.1; 43/24
[58] Field of Search .................... 43/18.1, 24, 18.5, 22

[56] References Cited

U.S. PATENT DOCUMENTS

| | | | |
|---|---|---|---|
| 2,721,412 | 10/1955 | Smiley | 43/24 |
| 3,401,482 | 9/1968 | Burns | 43/24 |
| 4,060,924 | 12/1977 | Cunningham | 43/24 |
| 4,186,508 | 2/1980 | Howald | 43/24 |
| 4,238,900 | 12/1980 | Cunningham | 43/24 |

FOREIGN PATENT DOCUMENTS 1383521 2/1975 United Kingdom .................... 43/24

*Primary Examiner*—Gene P. Crosby
*Attorney, Agent, or Firm*—Stevens, Davis, Miller & Mosher

[57] ABSTRACT

A fishing rod is provided which includes a reel fixture, a plurality of fishing line guides and a top guide. The fishing line guides each comprise a larger diameter line guide ring through which a rod body is inserted and a mounting piece extending lengthwise of the rod body from one circumferential side of the line guide ring. The mounting piece is fixed to the rod body at an intermediate position thereof between the reel fixture mounting position and a position on the rod body radially opposite to the reel fixture mounting position.

4 Claims, 2 Drawing Sheets

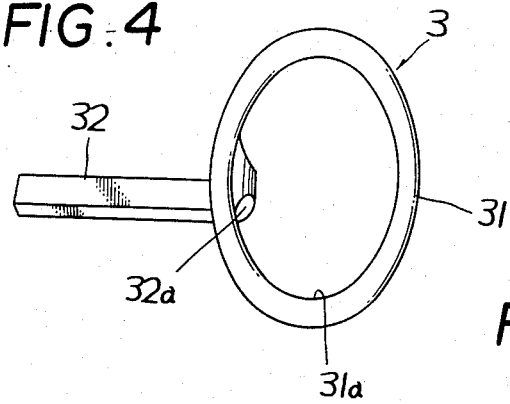
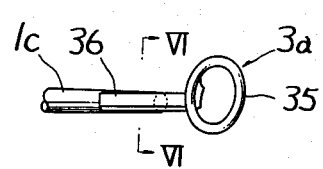
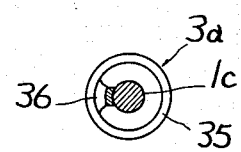
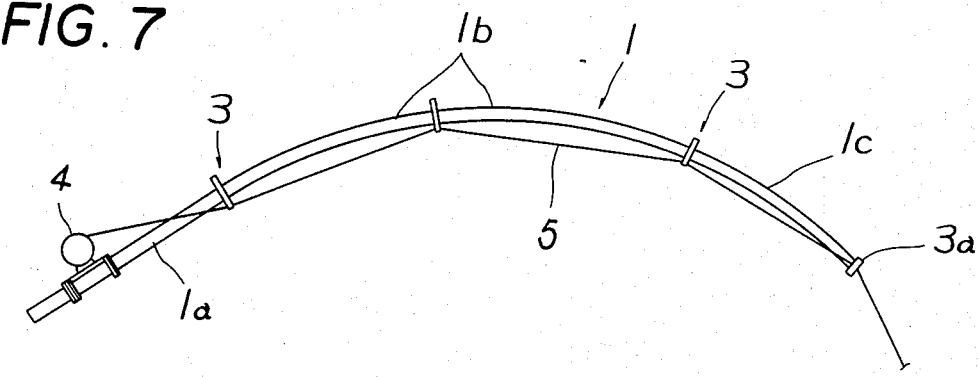
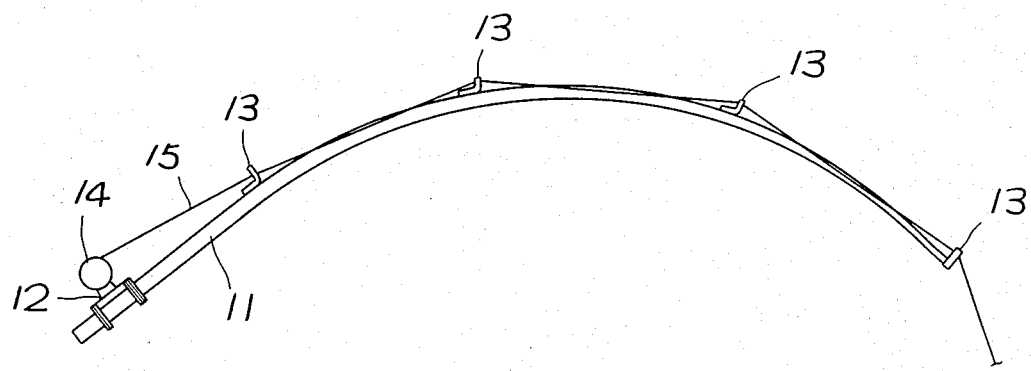

FISHING ROD

FIELD OF THE INVENTION

The present invention relates to a fishing rod for use with various types of fishing reels such as a double bearing reel or a spinning reel, and more particularly, to a fishing rod provided with a reel fixture for mounting the fishing reel to the fishing rod and a plurality of fishing line guides for guiding a fishing line drawn out from the fishing reel.

BACKGROUND OF THE INVENTION

This kind of conventional fishing rod, as shown in FIG. 8, has a reel fixture 12 mounted on the root portion of a rod body 11 of a predetermined length, and a plurality of fishing line guides 13 positional at a lengthwise intermediate portion and a tip portion of rod body 11. A fishing reel 14 is mounted to reel fixture 12 and a fishing line 15 is drawn out from reel 14 and is adapted to be guided by each guide 13.

Conventional line guides 13 are each adapted to position a line guide ring through which the line passes, in a position radially outward of rod body 11.

Accordingly, in a fishing rod used with a double bearing reel wherein the reel fixture is mounted on the upper surface of rod body 11, a line guide ring of each line guide 13 is mounted on the upper surface of rod body 11 in the same direction as the reel fixture mounting position, so that fishing line 15 is drawn out from fishing reel 14 and guided along the upper surface of rod body 11 through line guides 13 to thereby be led out from a top guide at the tip of rod body 11.

When the above-described fishing rod is used for fishing, fishing line 15 is guided through line guides 13 upwardly set at the upper surface of rod body 11, whereby when a hooked fish is drawn in, rod body 11 bends greatly to bring the line in contact with the lateral side surface of rod body 11 so that the line is subject to being rubbed therewith and cut. Also, when the hooked fish swims laterally, rod body 11 may be subjected to a twist load, resulting in a breakdown of rod body 11.

SUMMARY OF THE INVENTION

In light of the above problems, the present invention has been designed. An object thereof is to provide a fishing rod with improved line guides through which a fishing line can be guided along the upper or the lower surface of a rod body, thereby preventing the fishing line from being cut and the rod body from being broken.

The fishing rod of the invention includes (1) a rod body having a root, a tip and an intermediate portion, and (2) a reel fixture for a fishing reel and fishing line guides for guiding the fishing line drawn out from the reel mounted on one circumferential side of the root portion of the rod body, with the line guides each comprising a line guide ring inserted onto the outer periphery of the rod body and for guiding the fishing line and a mounting piece extending lengthwise of the rod body from one side of the line guide ring and with the mounting piece being fixed to an intermediate portion between the reel fixture mounting position and the position diametrically opposite thereto at the outer periphery of the rod body.

For example, a double bearing reel, when used for fishing, is upwardly mounted to the reel fixture. In this case, since the mounting piece at each fishing line guide is fixed to an intermediate portion of the outer periphery of the rod body between the reel fixture mounting position and the position opposite thereto, when an angler intends to drawn in a hooked fish, the line is guided along the lower surface of the fishing rod through the line guide rings in spite of the fact that the double bearing reel is mounted upwardly of the rod body.

Accordingly, the fishing line makes less contact with the rod body to thereby be prevented from being cut. Also, the rod body is not subjected to a twist load from the line, thereby avoiding being broken.

The above and further objects and novel features of the invention will be more fully apparent from the following detailed description when the same is read in connection with the accompanying drawings.

BRIEF DESCRIPTION OF THE DRAWINGS

FIG. 4 is a perspective view of a fishing line guide only;

FIG. 5 is a partial perspective view of a modified embodiment of the invention, showing a top guide thereof only;

FIG. 6 is a sectional view taken along line VI—VI in FIG. 5;

FIG. 7 is a side view showing the operation of the fishing rod shown in FIG. 1; and FIG. 8 is a side view illustrating a conventional fishing rod for comparison with FIGS. 1 and 7.

DETAILED DESCRIPTION OF THE PREFERRED EMBODIMENTS

Figure 1:
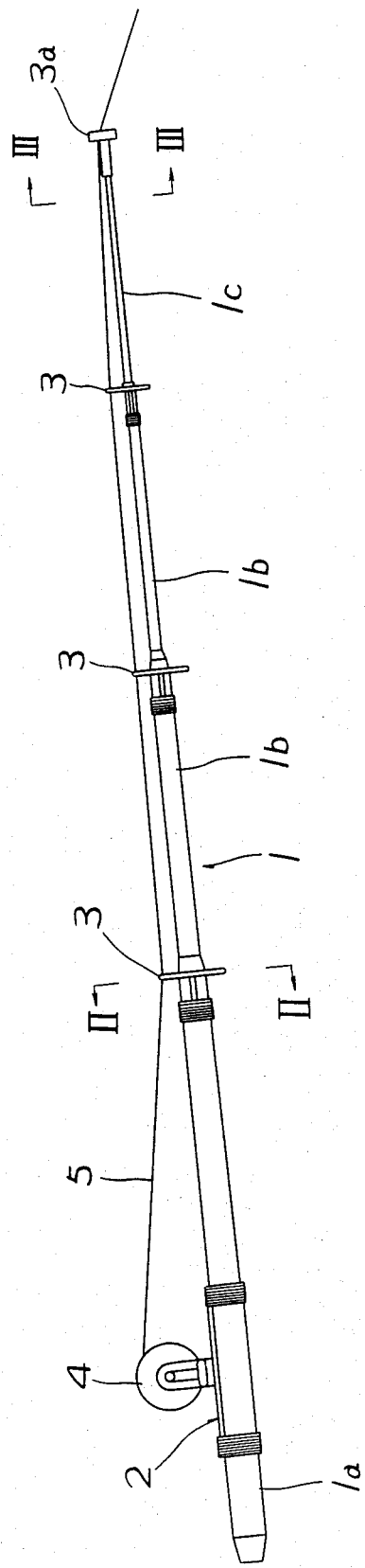
FIG. 1 is an overall side view of an embodiment of a fishing rod of the invention.

FIG. 1 shows a jointed fishing rod having a rod body 1 which comprises a root or butt 1a, a plurality of intermediate rods 1b and a tip 1c connected to the foremost end of intermediate rod 1b. Root 1a fixedly supports a fishing reel fixture 2. A plurality of line guides 3 for guiding a fishing line 5 drawn out from reel 4 are mounted on root 1a and each intermediate rod 1b and spaced at regular intervals, and a top guide 3a is mounted to the utmost end of tip 1c. Reel fixture 2 is upwardly oriented, and reel 4 constituting a double bearing reel in the illustrated embodiment is mounted upwardly on reel fixture 2.

Figure 2:
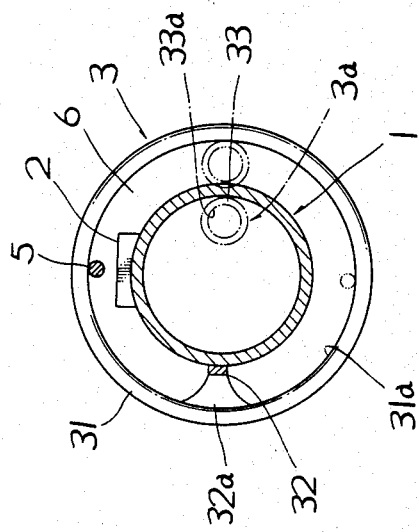
FIG. 2 is a sectional view taken along line II—II in FIG. 1.

In an embodiment of the fishing rod of the invention shown in FIG. 1, all fishing lines guides 3 except for top guide 3a are constructed as shown in FIGS. 1 and 2. Each fishing line guide 3 comprises a line guide ring 31 having a line guide bore 31a with an inner diameter enabling it to be inserted onto rod body 1 and to guide fishing line 5 and a mounting piece 32 extending lengthwise of rod body 1 from one side of line guide ring 31. Mounting piece 32 is fixed in an intermediate position at the outer periphery of rod body 1 between the upper position where reel fixture 2 is fixed and the lower position diametrically opposite to the reel fixture mounting position.

In greater detail, each fishing line guides 3 forms a circular line guide ring 31 having line guides bore 31a having an inner diameter large enough to enable the fishing line to move therethrough between it and the outer diameter of rod body 1. At one circumferential side of line guide ring 31 is mounted a leg 32a integral therewith and extending radially inwardly toward rod body 1. Mounting piece 32 extending from the end of leg 32a along the outer periphery of rod body 1 is formed integrally with leg 32a.

Line guide ring 31 is inserted onto rod body 1 and fixed to a predetermined lengthwise position at the outer periphery of rod body 1 by means of a fixing string or the like, thereby forming between rod body 1 and line guide ring 31 a space through which line 5 is movable.

Referring to FIG. 2, mounting piece 32 is fixed at an intermediate position displaced at a 90° angle counter-clockwise from reel fixture 2. Hence, fishing line 5 can be movably guided in space 6 at each line guide ring 31 along the inner periphery of each line guide ring 31 from the upper position opposite to reel fixture 2 shown in the solid circle to the lower position in the phantom circle in FIG. 2.

Figure 3:
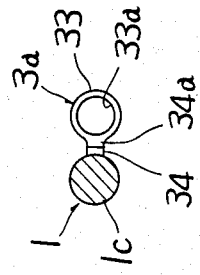
FIG. 3 is an enlarged sectional view taken along line III—III in FIG. 1.

Top guide 3a, as shown in FIG. 3, comprises a line guide ring 33 having a line guide bore 33a and a mounting piece 34 extending lengthwise of rod body 1 from one side of line guide ring 33 through a leg 34a. Line guide ring 33 is not inserted onto rod body 1, but is mounted at an intermediate position opposite to the intermediate position where each fishing line guide 3 is mounted. Hence, line guide ring 33 is displaced laterally of rod body 11 as shown in FIG. 3.

In the fishing rod constructed as described above, when a double bearing reel 4 is used therewith for fishing, in spite of the fact that reel 4 is set upwardly on rod body 1 and fishing line 5 drawn out from reel 4 is positioned at the upper portion of line guides bore 31a at each line guide ring 31 as shown by the solid line in FIG. 2, when an angler is drawing in a hooked fish, line 5 moves downwardly in line guide bore 31a as shown by the phantom line in FIG. 2.

In other words, when rod body 1 bends greatly due to the hooked fish, fishing line 5, as shown in FIG. 7, is guided along the lower surface of rod body 1.

Accordingly, fishing line 5 makes less contact with rod body 1, thereby avoiding being cut. Also, rod body 1, when the hooked fish is drawn in, has no twist load applied thereto by fishing line 5, thereto being prevented from being broken.

Top guide 3a is mounted on rod body 1 laterally of the reel mounting position and opposite to mounting piece 32 of fishing line guide 3, and fishing line 5 to be led out from tip 1c is guided through line guide ring 33 toward the side diametrically opposite to the mounting position of mounting piece 32 of each fishing line guide 3 at rod body 1 (the right-hand side in FIG. 2), thereby always restricting the downward movement of fishing line 5 toward the opposite side to the mounting position of mounting piece 32, thus enabling further smooth movement of line 5.

Alternatively, line guide ring 35 of top guide 3a may be mounted such that its center coincides with the axis of rod body 1 as shown in FIGS. 5 and 6.

In this embodiment, top guide 3a is provided at one circumferential side of a line guide ring 35 and toward the axis thereof with a mounting piece 36 extending lengthwise of rod body 1. Mounting piece 36 is fixed at an intermediate circumferential position in the same direction as the mounting position of each mounting piece 32.

The above-described embodiments of the invention are shown used with double bearing reel 4, but the present invention is applicable not only to use with a double bearing reel but also to use with, e.g., a spinning reel. When a spinning reel is used, reel fixture 2 is oriented downward of rod body 1 and supports the spinning reel downwardly of the rod body.

As seen from the above, the fishing rod of the invention includes fishing line guides 3 mounted to rod body 1 and each comprising a line guide ring 31 having a line guide bore 31a inserted onto the outer periphery of rod body 1 and a mounting piece 32 extending from one side of line guide ring 31 lengthwise of rod body 1, so that mounting piece 32 is fixed to the intermediate position between the reel fixture mounting position at rod body 1 and the position diametrically opposite to reel fixture 2. Accordingly, even when a double bearing reel is mounted on the fishing rod, fishing line 5 can be guided along the lower surface of rod body 1 for drawing in a hooked fish. Hence, fishing line 5 makes less contact with rod body 1 thus avoiding being cut. Also, rod body 1 is not subjected to a twist load caused by fishing line 5, thereby being prevented from being broken.

Although the invention has been described with reference to several different embodiments, these embodiments are merely exemplary and not limiting of the invention, which is defined solely by the appended claims.

What is claimed is:

1. A fishing rod, comprising:
a rod body having a root portion, a tip portion and an intermediate portion between said root portion and said tip portion;
a reel fixture fixed to one circumferential side of said root portion;
a plurality of first fishing line guides fixed to said root portion and said intermediate portion so as to guide to said tip portion a fishing line drawn out from a fishing reel mounted to said reel fixture; and
a second top fishing line guide mounted on said tip portion; each of said first fishing line guides including (i) a first line guide ring having an inner diameter enabling it to be inserted onto an outer periphery of said rod body and comprising guide means for guiding said fishing line and (ii) a first mounting piece extending parallel to a longitudinal direction of said rod body and from one circumferential side of said first line guide ring, said first mounting piece being fixed to an intermediate circumferential position of said rod body between said one circumferential side of said room portion at which said reel fixture is fixed and another circumferential position of said rod body radially opposite to said one circumferential side of said root portion.

2. A fishing rod according to claim 1, wherein said second top fishing line guide is provided with a second line guide ring for guiding said fishing line and a second mounting piece extending parallel to said longitudinal direction of said rod body and from one circumferential side of said second line guide ring, said second mounting piece being fixed to said rod body such that said second line guide ring is positioned at an intermediate circumferential position of said rod body radially opposite to said intermediate circumferential position of said first mounting piece of each of said first fishing line guides.

3. A fishing rod according to claim 1, wherein said second top fishing line guide is provided with a second line guide ring for guiding said fishing line and a second mounting piece disposed to be oriented from one circumferential side of said second line guide ring toward an axis of said second line guide ring and extending parallel to said longitudinal direction of said rod body, said second mounting piece being fixed to said rod body such that said second line guide ring is substantially coaxial with said rod body.

4. A fishing rod according to claim 3, wherein said second mounting piece is fixed to an intermediate circumferential position of said rod body and oriented in the same direction as said intermediate circumferential position at which said first mounting piece of each of said first fishing line guides is fixed.

* * * * *